United States Patent [19]

Kimura

[11] 4,409,472

[45] Oct. 11, 1983

[54] IRIS SERVO APPARATUS

[75] Inventor: Kenji Kimura, Tachikawa, Japan

[73] Assignee: Olympus Optical Co., Ltd., Tokyo, Japan

[21] Appl. No.: 254,299

[22] Filed: Apr. 15, 1981

[30] Foreign Application Priority Data

Apr. 28, 1980 [JP] Japan .................................. 55/56867

[51] Int. Cl.³ ............................ G01J 1/20; H04N 5/34
[52] U.S. Cl. ..................................... 250/201; 250/229; 358/228
[58] Field of Search ................. 250/201, 229; 358/228; 350/269

[56] References Cited

U.S. PATENT DOCUMENTS 3,123,724  3/1964  Schrenk et al. ...................... 250/229
3,555,181  1/1971  Thommen ........................ 358/228 X
4,174,526  11/1979  Geurts ............................. 358/228 X Primary Examiner—David C. Nelms
Assistant Examiner—Edward P. Westin
Attorney, Agent, or Firm—Frishauf, Holtz, Goodman and Woodward

[57] ABSTRACT

An iris servo apparatus comprises a first servo system (iris servo) and a second servo system (AGC circuit). When the first servo system is saturated, which state corresponds to full opening of iris, the second servo system automatically starts. That is, the second servo system does not effect gain control until the level of an output signal of the first servo system becomes sufficiently high. Switching the first servo system to the second servo system or vice versa is automatically conducted.

7 Claims, 3 Drawing Figures

IRIS SERVO APPARATUS

BACKGROUND OF THE INVENTION

This invention relates to an iris servo apparatus which is used in a television camera and the like.

An iris servo apparatus is designed to produce video signals of a constant level, regardless of the brightness of an object of photography. The apparatus has a function which is, in principle, similar to that of the known electric eye device of a camera. The prior art iris servo apparatus used in a television camera is generally provided with a servo mechanism. The prior art iris servo apparatus detects the average level or peak level of video signals generated by a television camera. According to the level of the video signals thus detected, the servo mechanism controls the iris mechanism of the television camera. Under the control of the servo mechanism the iris mechanism applies a constant amount of light onto the target of the image pickup tube provided within the television camera.

An AGC (automatic gain control) circuit has long been used to keep the level of video signals at a predetermined value. It is known that an AGC circuit and the above-mentioned servo mechanism are used in combination. In such combination the servo mechanism and the AGC circuit operate independently of each other. When the servo mechanism is functioning, the AGC circuit (i.e. electrical servo system) remains idle. Conversely, when the AGC circuit is operating, the servo mechanism remains non-operative. This is because a more stable, accurate servo control can be achieved when the two servo systems are operated independently than otherwise. The more light applied to the image pickup tube, the better, as long as a circuit for processing the video signals is not saturated. The S/N (signal-to-noise) ratio of the video signal is proportional to the input level of the circuit, which is proportional to the amount of light supplied to the image pickup tube. In the conventional iris servo apparatus which uses both a mechanical servo system and an electrical servo system it is necessary to switch one servo system to the other at an optimum time. Otherwise, the iris servo apparatus cannot produce video signals with a high S/N ratio, while preventing the video signal processing circuit from being saturated. Such a timely switching between the two servo systems is very difficult for an operator to successfully achieve.

SUMMARY OF THE INVENTION

It is an object of this invention to provide an iris servo apparatus which can accurately respond to a variation of brightness of an object over a wide range of brightness, while maintaining a high S/N ratio of the video signals it produces.

An iris servo apparatus according to this invention comprises a first servo system (iris servo) and a second servo system (AGC circuit). When the first servo system is saturated, which state corresponds to full opening of iris, the second servo system automatically starts. That is, the second servo system does not effect gain control until the level of an output signal of the first servo system becomes sufficiently high. Thus, in the second servo system (AGC circuit) the S/N ratio is hardly deteriorated. Switching the first servo system to the second servo system or vice versa is automatically conducted. A TV camera, if provided with the iris servo apparatus of this invention, can be easily operated since no manual switching between the two servo systems is required. This enables the cameraman to keep his mind solely on shooting the object.

DETAILED DESCRIPTION OF THE PREFERRED EMBODIMENT

Figure 1:
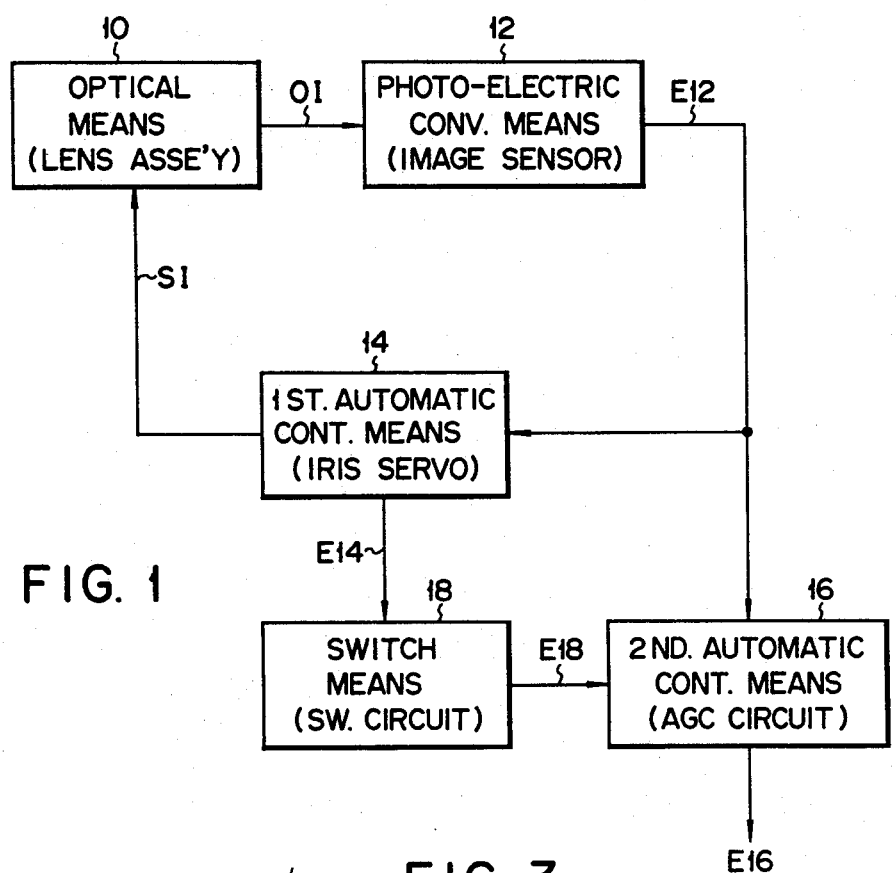
FIG. 1 is a block diagram of an iris servo apparatus according to this invention.

Referring to the drawings, an embodiment of the invention will be described. To avoid a lengthy, wordy description, like and the same elements will be designated by like and the same reference numerals in the drawings.

FIG. 1 illustrates a basic structure of an iris servo apparatus according to this invention. The apparatus comprises an optical means 10, a photoelectric converting means 12, a first automatic control means 14, a second automatic control means 16 and a switch means 18. The optical means 10 optically senses an object (not shown) and provides optical information OI. In a TV camera the optical means 10 is comprised of a lens assembly including an iris mechanism and other mechanisms. The optical information OI is supplied to the photoelectric converting means 12. The photoelectric converting means 12 comprises, for example, a conventional image pickup device which includes an image orthicon or a vidicon and a circuit for amplifying and processing video signals generated by the image orthicon or vidicon.

The photoelectric converting means 12 generates a video signal corresponding to the object, or a first signal E12. The signal E12 is supplied to both automatic control means 14 and 16. According to the signal E12, the first automatic control means 14 achieves servo control on the iris mechanism of the optical means 10. The second automatic control means 16 electrically controls the level of the signal E12. The first automatic control means 14 feeds back to the optical means 10 servo information SI which corresponds to the signal E12. The means 10, 12 and 14 comprise a first servo system, i.e. iris servo system. The second automatic control means 16 forms part of a second servo system, i.e. AGC circuit.

Under the control of the first servo system the signal E12 remains at a first predetermined level. More specifically, when the object is a bright one, iris mechanism of optical means 10 is so closed as to prevent the level of the signal E12 from rising. Conversely, when the object is a dark one, the iris mechanism is so opened as to prevent the level of the signal E12 from lowering. As long as the first servo system works in this way, gain of second automatic control means 16 is maintained at a relatively small predetermined value. This predetermined value may be changed by, for example, manual operation. The output video signal of second automatic control means 16, i.e. a third signal E16, has a level which is either proportional or inversely proportional to the first signal E12.

When the object is so dark that the iris mechanism of the optical means 10 fully opens, the first automatic control means 14 supplies a switch signal E14 to the switch means 18. Upon receipt of the switch signal E14 the switch means 18 supplies a second signal E18 to the second automatic control means 16. Then, the operation mode of the second automatic control means 16 is change from a fixed gain mode to a variable gain mode, whereby the second automatic control means 16 may function as an AGC circuit. In other words, the switch means 18 generates a second signal E18 when the first automatic control means 14 is brought into a special state (i.e. when the first servo system is saturated and the iris mechanism of the optical means 10 opens up), and the second automatic control means 16 generates a third signal E16 of a second predetermined level when it receives the second signal E18 from the switch means 18. Hence, the means 14, 16 and 18 comprise a second servo system, i.e. AGC circuit.

As mentioned above, the gain of the second automatic control means 16 is not larger than necessary as long as the first servo system operates. The third signal E16 therefore contains but a little noise unless the first servo system is saturated. When the first servo system is saturated and the second automatic control means 16 starts operating as an AGC circuit (i.e. when the second servo system starts working), the iris mechanism of the optical means 10 remains open and the level of the first signal E12 is therefore relatively high. In this case, too, it is easy to reduce the noise in the third signal E16. The structure of FIG. 1 can therefore accomplish an iris servo operation over a wide range of brightness of the object, while producing video signals of a high S/N ratio.

Figure 3:
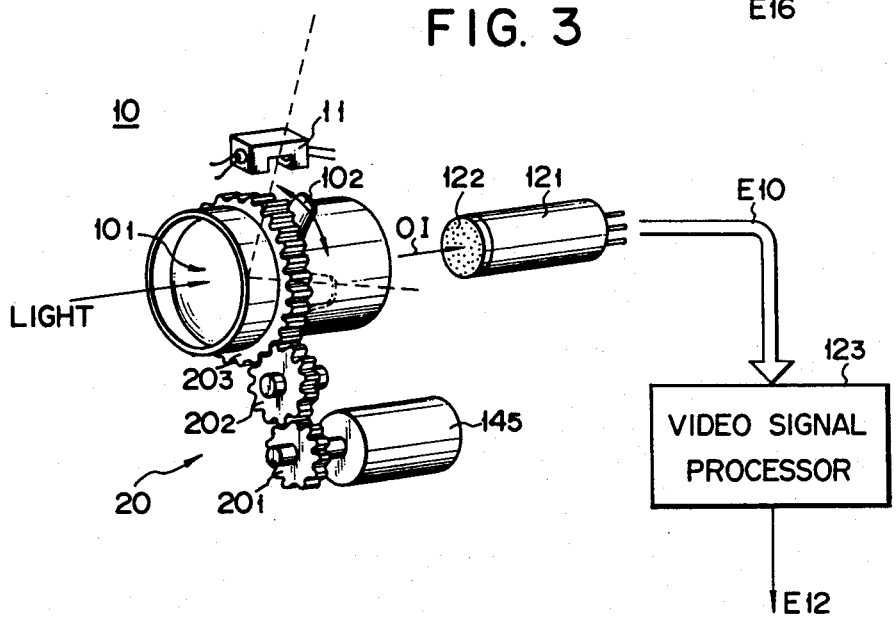
FIG. 3 shows the lens assembly, image sensor and iris servo mechanism—all illustrated in FIG. 1.
Figure 2:
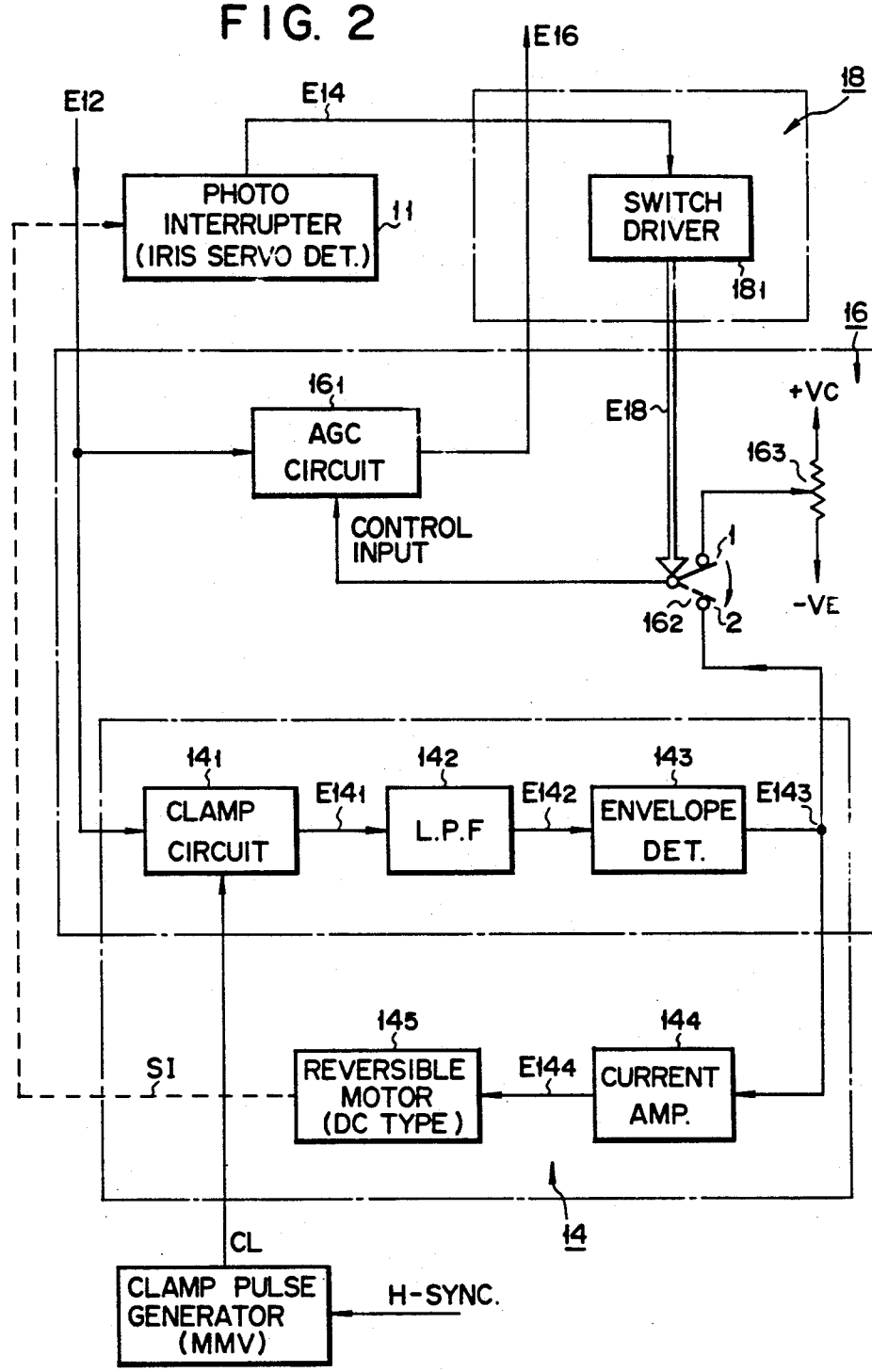
FIG. 2 is a block diagram showing the apparatus of FIG. 1 more in detail.

FIGS. 2 and 3 illustrate the iris servo apparatus in greater detail than FIG. 1. As shown in FIG. 2, the first signal E12 is supplied to a clamp circuit $14_1$ and an AGC circuit $16_1$, both being of known type. The signal E12 is clamped (or, sampled and held) by the circuit $14_1$ at the time a clamp pulse CL is generated which is synchronous with a horizontal synchronizing pulse produced by the photoelectric converting means 12. The circuit $14_1$ clamps the component of the signal E12, whose level is in the vicinity of back porch level, and DC-restores this component, thereby generating an output signal $E14_1$. The signal $E14_1$ is supplied to a low-pass filter (LPF) $14_2$. Upon receipt of the signal $E14_1$ the LPF $14_2$ produces an output signal $E14_2$ which has a level corresponding to the average level of the signal $E14_1$. The signal $E14_2$ is supplied to an envelope detector circuit $14_3$, which converts the signal $E14_2$ into a DC signal $E14_3$. The circuit $14_3$ may be comprised of a diode rectifier and a CR filter. The DC level of the signal $E14_3$ is therefore substantially proportional to the level of the first signal E12. The signal $E14_3$ is supplied to a current amplifier $14_4$ and amplified and made into a motor drive signal $E14_4$ having a sufficient electric energy. The signal $E14_4$ is supplied to a DC motor $14_5$ which can rotate in either direction. The elements $14_1$ to $14_5$ comprise the first automatic control means 14 shown in FIG. 1.

The rotation of the motor $14_5$ driven by the signal $E14_4$ is transmitted to a photo-interrupter 11 and is used as a part of the servo information SI. The information SI is transmitted to the interrupter 11 by, for example, such a gear mechanism 20 as shown in FIG. 3. Suppose the amount of light entering a lens assembly $10_1$ of the optical means 10 is large. In this case, the optical information OI represents the large amount of light passing through the lens assembly $10_1$ and reaching the target surface $12_2$ of an image pickup tube $12_1$. The image pickup tube $12_1$ generates a video signal E10 which has, in this case, a high level. The output signal E10 of the image pickup tube $12_1$ is amplified and processed in a predetermined manner by a video signal processing circuit $12_3$ of known type, which produces the above-mentioned first signal E12.

Thus, the first signal E12 has a high level when the object is bright. It has a low level when the object is dark. Current proportional to the level of the first signal E12 is supplied to the motor $14_5$. The motor $14_5$ is driven by the signal E12, for instance, in clockwise direction. The rotation of the motor $14_5$ is transmitted through gears $20_1$, $20_2$ and $20_3$ to an iris mechanism of the lens assembly $10_1$. Subsequently, the iris mechanism gradually closes as the motor $14_5$ rotates clockwise. The gear $20_3$ has a screen $10_2$. The screen $10_2$ moves away from an optical path of the photo-interrupter 11 as the motor $14_5$ rotates clockwise and, at the same time, the gear $20_3$ rotates also clockwise. In consequence, the optical information OI or the amount of light reaching the target surface $12_2$ grows smaller and smaller as the motor $14_5$ is driven clockwise. When the level of the signal E12 lowers to a predetermined value, the motor $14_5$ stops.

Conversely, when the object is dark and the lens assembly $10_1$ receives a little light, the motor $14_5$ rotates counterclockwise thereby to open the iris mechanism of the lens assembly $10_1$ little by little. The motor $14_5$ keeps rotating until the signal E12 reaches the predetermined level. If the object is darker than what is represented by the predetermined level of the signal E12, the motor $14_5$ stops when the iris mechanism comes to have the largest opening. In this case, the first servo system becomes saturated and the screen $10_2$ blocks the optical path of the photo-interrupter 11. As a result, as shown in FIG. 2, the photo-interrupter 11 generates a switching signal E14. The switching signal E14 is supplied to a switch driver circuit $18_1$ including, for example, a relay circuit which is driven by a transistor switch. In response to the signal E14 the switch driver circuit $18_1$ throws the movable contact of a switch $16_2$ from a contact 1 to a contact 2. The voltage controlling the AGC circuit $16_1$ is then changed to the level of the signal $E14_3$ from a given DC level which is derived from a slider of a variable resistor $16_3$. Once the voltage has been changed to the level of the signal $E14_3$, the AGC circuit $16_1$ starts automatically controlling the level of the signal E12, in place of the first servo system which has been saturated and which can no longer control the level of the signal E12.

That is, the AGC circuit $16_1$ has a fixed gain corresponding to the DC level derived from the slider of the variable resistor $16_3$ as long as the first servo system is operating or as long as the screen $10_2$ lies outside the optical path of the photo-interrupter 11. It achieves gain control according to the level of the first signal E12 thereby to maintain the third signal E16 at a specific level as long as the first servo system remains saturated, or as long as the screen $10_2$ blocks the optical path of the photo-interrupter 11 and the iris mechanism of the lens assembly $10_1$ is thus opened to the maximum degree.

This invention is not limited to the embodiment which has been described above with reference to the drawings. Various modifications are possible within the scope of the invention. For example, digital servo systems may be used for the first and second servo systems, instead of analog servo systems. Further, the gear mechanisms may be replaced by other means which can transmit servo information SI. Still further, the switch means 18 may comprise, instead of the mechanical relay contacts, a semiconductor switching circuit or an electronic switch circuit such as photo-coupler. Moreover, other automatic control means than the first automatic control means 14 and the second automatic control means 16 may be provided, using a plurality of AGC circuits (servo loop). More specifically, a third automatic control means may be provided in addition to the first and second automatic control means 14 and 16. If this is the case, the second automatic control means 16 starts operating when the first automatic control means 14 becomes saturated, and the third automatic control means starts operating when the second automatic control means 16 becomes saturated, thereby to control the third signal E16. Such third automatic control means may have a structure similar to that of the second servo system which includes the second automatic control means 16.

What is claimed is:

1. An iris servo apparatus comprising:
   optical means including an iris mechanism and adapted to obtain optical information corresponding to an object being photographed;
   photoelectric converting means coupled to said optical means for converting said optical information obtained by said optical means into a first electrical signal;
   first automatic control means coupled to said photoelectric converting means and to said iris mechanism for controlling said iris mechanism responsive to said first electrical signal so as to maintain the level of said first electrical signal at a first predetermined level;
   switch means coupled to said first automatic control means for detecting how said iris mechanism is controlled by said first automatic control means and for outputting a second electrical signal from said first automatic control means when said iris mechanism of said optical means is controlled to be fully opened; and
   second automatic control means coupled to said photoelectric means and to said switch means for generating a third electrical signal responsive to said first electrical signal, the gain of said second automatic control means being controlled responsive to outputting of said second electrical signal by said switch means such that the level of said third electrical signal becomes equal to a second predetermined level;
   said first automatic control means alone controlling said iris mechanism and said second automatic control means being substantially inoperable as long as said switch means does not output said second electrical signal; and
   said second automatic control means alone controlling said iris mechanism responsive to said switch means outputting said second electrical signal.

2. The iris servo apparatus of claim 1, wherein:
   said optical means, photoelectric converting means and first automatic control means comprise a first servo system; and
   said first automatic control means, switch means and second automatic control means comprise a second servo system which starts operating when said first servo system is saturated and responsive to said switch means outputting said second electrical signal.

3. The iris servo apparatus of claim 1 or 2, wherein:
   said optical means includes a sensor for generating a switch signal when said iris mechanism is fully open;
   said second automatic control means includes an AGC amplifier connected to receive said first electrical signal for generating said third electrical signal, and a switch for switching a control input circuit of said AGC amplifier; and
   said switch means includes a switch driver for switching said switch of said second automatic control means such that a control signal corresponding to said first electrical signal is supplied to the control input of said AGC amplifier when said sensor generates said switch signal.

4. The iris servo apparatus of claim 1 or 2, wherein said second automatic control means operates in a fixed gain mode when said second electrical signal is not outputted by said switch means.

5. The iris servo apparatus of claim 3, wherein said second automatic control means operates in a fixed gain mode when said second electrical signal is not outputted by said switch means.

6. The iris servo apparatus of claim 1 or 2, wherein the gain of said second automatic control means is at its smallest specified value when said second electrical signal is not outputted by said switch means.

7. The iris servo apparatus of claim 3, wherein the gain of said second automatic control means is at its smallest specified value when said second electrical signal is not outputted by said switch means.

* * * * *